United States Patent [19]

Iwasa

[11] Patent Number: 5,332,600
[45] Date of Patent: Jul. 26, 1994

[54] PRODUCTION METHOD FOR GLASS RUNS

[75] Inventor: Tadanobu Iwasa, Ichinomiya, Japan

[73] Assignee: Toyoda Gosei Co., Ltd., Nishikasugai, Japan

[21] Appl. No.: 22,396

[22] Filed: Feb. 23, 1993

Related U.S. Application Data

[63] Continuation of Ser. No. 673,898, Mar. 25, 1991, abandoned.

[30] Foreign Application Priority Data

Mar. 24, 1990 [JP] Japan ............................ 2-73889
Mar. 24, 1990 [JP] Japan ............................ 2-73890
Mar. 24, 1990 [JP] Japan ............................ 2-73891

[51] Int. Cl.$^5$ ............................................. B05D 3/02
[52] U.S. Cl. ................................... 427/393.5; 49/441
[58] Field of Search ............ 49/441; 427/208.2, 208.4, 427/407.2, 412.3, 413, 389.7, 393.5

[56] References Cited

U.S. PATENT DOCUMENTS

| | | | |
|---|---|---|---|
| Re. 32,757 | 9/1988 | Yamazaki et al. | 427/385.5 |
| 3,772,071 | 11/1973 | Harr | 427/413 |
| 3,873,348 | 3/1975 | Reilly et al. | 427/393.5 |
| 3,991,255 | 11/1976 | Blaskiewicz et al. | 427/393.5 |
| 4,496,611 | 1/1985 | Kawakubo et al. | 427/407.2 |
| 4,572,871 | 2/1986 | Mabuchi et al. | 427/385.5 |
| 4,622,193 | 11/1986 | Kresge et al. | 264/142 |
| 4,708,351 | 11/1987 | Midooka et al. | 49/475 |
| 4,789,703 | 12/1988 | Fabris et al. | 524/464 |
| 5,014,464 | 5/1991 | Dupuy et al. | 49/440 |
| 5,123,988 | 6/1992 | Iwasa | 264/177.1 |
| 5,137,675 | 8/1992 | Rabe | 264/177.1 |
| 5,143,772 | 9/1992 | Iwasa | 264/45.9 |

FOREIGN PATENT DOCUMENTS

| | | |
|---|---|---|
| 57-014986 | 3/1982 | Japan . |
| 62-015344 | 4/1987 | Japan . |
| 62-172043 | 7/1987 | Japan . |
| 62-161012 | 10/1987 | Japan . |

OTHER PUBLICATIONS

JIS Japanese Industrial Standard, Physical Testing Methods for Vulcanized Rubber JSI 6301-1975 (no month available).

*Primary Examiner*—Shrive Beck
*Assistant Examiner*—Diana Dudash
*Attorney, Agent, or Firm*—Cushman, Darby & Cushman

[57] ABSTRACT

A production method for a glass run of EPDM material with a urethane slip layer and/or a flocked layer on its glass sliding area, whereby a primer layer for a urethane slip layer or a flocked layer can be co-extruded together with a glass run substrate of EPDM material. The primer layer is a polymer blend of NBR 40-80%, EPDM 20-60%, and SBR 0-35% by weight, respectively. Solventless urethane coating material is applied on each primer layer to form a urethane coat. Flocking is provided only on flocked layer area. The urethane coat is cured during vulcanization of the glass run substrate, and in this way a urethane slip layer and a flocking layer can be formed.

2 Claims, 3 Drawing Sheets

PRODUCTION METHOD FOR GLASS RUNS

This is a continuation of application Ser. No. 07/673,898, filed on Mar. 25, 1991, now abandoned.

BACKGROUND OF THE INVENTION

1. Field of the Invention

The present invention relates to methods of producing glass run substrates of EPDM with a urethane slip layer. The present invention further relates to molded articles having an adhesive layer.

2. Background Information

Glass runs are typically made of ethylene-propylene-diene terpolymers (hereinafter "EPDM") because of its weathering resistance, ozone resistance, heat resistance and other factors. The sliding areas of channel type glass runs, that is, a grooved bottom $1a$ and a sliding lip $1b$ (see FIG. 1), are provided either with a flocked layer or a urethane slip layer to lessen the glass sliding resistance (Japanese Patent Publication Nos. 62-15344 and 57-14986).

From the standpoint of lessening the glass sliding resistance, presently the flocked layer is more preferable than the urethane slip layer, however, a sliding lip with the flocked layer tends to cause wind noises.

Therefore, a channel type glass run having a flocked layer on the grooved bottom and a urethane slip layer on both sides of the sliding lip was needed and has been proposed (Japanese Utility Model Kokai Publication No. 62-161012).

However, the process to form a flocked layer and a urethane slip layer must be carried out separately, which increases the number of production processes required. Further, the adhesion is poor between EPDM substrate and the urethane coats formed of urethane coating material which is used to form the flocking layers and slip layers.

Therefore, pre-treatment of the glass sliding area is required, after the glass run substrate is extruded and vulcanized. Such pre-treatment includes, for example, buffing, degreasing and primer coating. After the urethane is coated (or after piles are spattered in case of flocked layers), the urethane coats need to be cured in a drying furnace. Such requirement affects the productivity. In addition, the continuous production system needed is significantly longer.

SUMMARY OF THE INVENTION

An object of this invention is to provide molded and shaped articles and novel methods of producing glass runs and weather strips of EPDM substrate, with a urethane slip layer or a flocked layer on its glass sliding contact area.

In one aspect, the invention comprises molded and shaped articles having an EPDM substrate, an urethane outer layer and an adhesive layer of NBR, EPDM and optionally, SBR.

This invention includes the following features:

(1) co-extruding an EPDM substrate with an adhesion layer on its glass sliding area, the adhesion layer comprising a polymer blend or a rubber compounded with a recipe of NBR 40-80%, EPDM 20-60% and SBR 0-35% by weight respectively;

(2) applying solventless urethane coating material and forming a urethane coat on the adhesion layer immediately after extrusion; and (3) curing the applied urethane coat while the glass run substrate is being vulcanized, thereby forming the urethane slip layer.

These features enable efficient production of weather strips having urethane slip layers on the glass sliding areas, and also make it possible to shorten the production line significantly.

The invention also includes the following features:

(1) co-extruding an EPDM substrate with an adhesion layer on its glass sliding area, the adhesion layer comprising a polymer blend or a rubber compounded with a recipe of NBR 40-80%, EPDM 20-60% and SBR 0-35% by weight, respectively;

(2) applying solventless urethane coating material and forming a urethane coat on the adhesion layer immediately after extrusion and then allowing flocking thereon; and (3) curing the applied urethane coat while the glass run substrate is being vulcanized, thereby forming the urethane slip layer.

These features enable efficient production of weather strips having a flocked layer on their glass sliding areas, and also make it possible to shorten the production line significantly.

In another aspect, the invention relates to a production method for a channel type glass run having a flocked layer on the grooved bottom and a urethane slip layer on both sides of its glass sliding lip. The method comprising:

(1) extruding a primer layer on a sliding area on the glass run substrate, the primer layer comprising a polymer blend or a rubber compounded with a recipe of NBR 40-80%, EPDM 20-60% and SBR 0-35% by weight, respectively;

(2) applying a solventless urethane coating material to the primer layer to form a urethane coat, immediately after the extrusion, on each primer layer of the grooved bottom and on both sides of sliding lip;

(3) flocking the grooved bottom after the urethane coat is formed; and (4) curing each of the urethane coats to form the urethane slip layer and flocked layer during the vulcanization process for the glass run substrate.

These features enable efficient production of weather strips with a flocked layer on the grooved bottom of the channel type glass run sliding area and a urethane slip layer on the sliding lip. It is also possible to shorten the production line significantly.

DETAILED DESCRIPTION OF THE INVENTION

The polymers and plasticizers used are herein abbreviated as follows:

NBR:Nitrol rubber (also known as nitrile-butadiene rubber).

EPDM:Ethylene-α-olefin-nonconjugated diene forms of copolymer rubber, a typical example of which is ethylene-propylene-diene terpolymer rubber.

SBR:Aromatic vinyl compound-diene forms of copolymer rubber, a typical example of which is styrene-butadiene rubber.

DOP:Dioctyl phthalate

It should be noted that "part" and "%" used herein for compounding recipes shall mean weight unit, unless otherwise specified.

Figure 2:
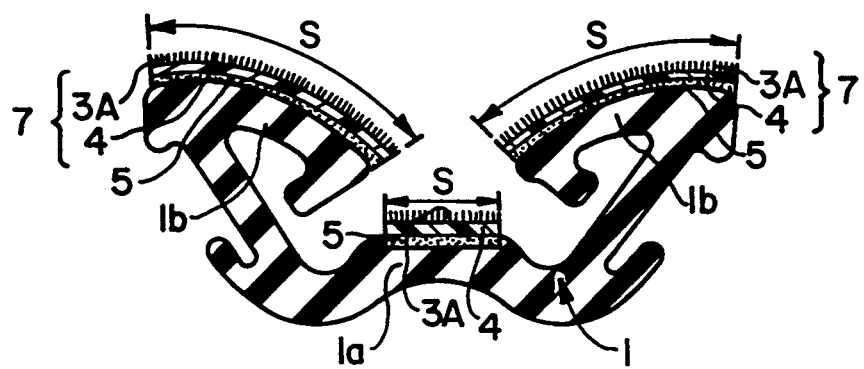
FIG. 2 shows a cross-sectional view of another example of a channel type glass run of this invention.
Figure 3:
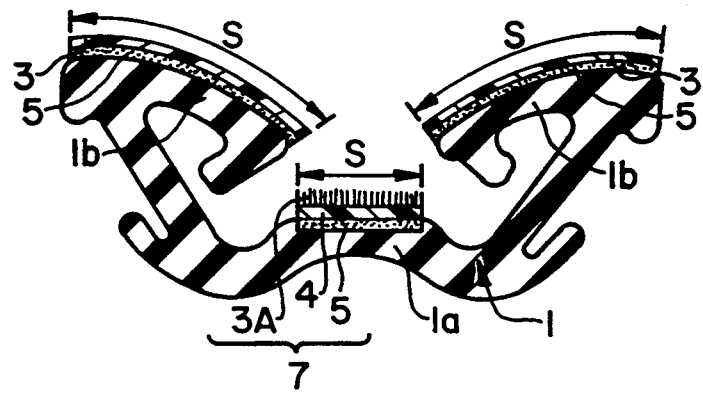
FIG. 3 shows a cross-sectional view of a third example of a channel type glass run.
Figure 5:
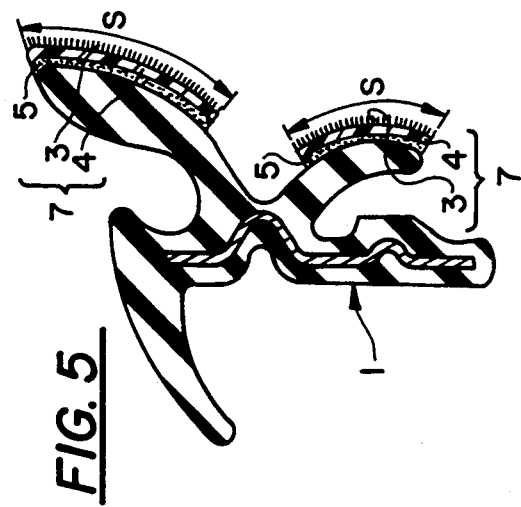
FIG. 5 shows a cross-sectional view of another example of a glass weather strip.

The glass runs to which this invention are applicable include, but are not limited to, door glass runs (FIGS. 1, 2, 3), door glass weather strips (FIGS. 4, 5) and others.

Figure 1:
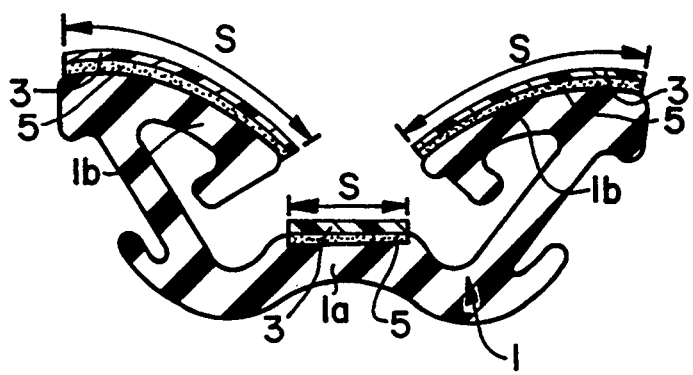
FIG. 1 shows a cross-sectional view of an example of a channel type glass run to which the production method of this invention is applicable.
Figure 4:
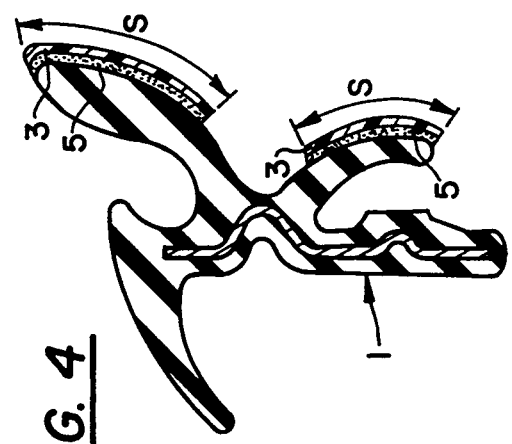
FIG. 4 shows a cross-sectional view of an example of a glass weather strip to which the production method of this invention is applicable.
Figure 6:
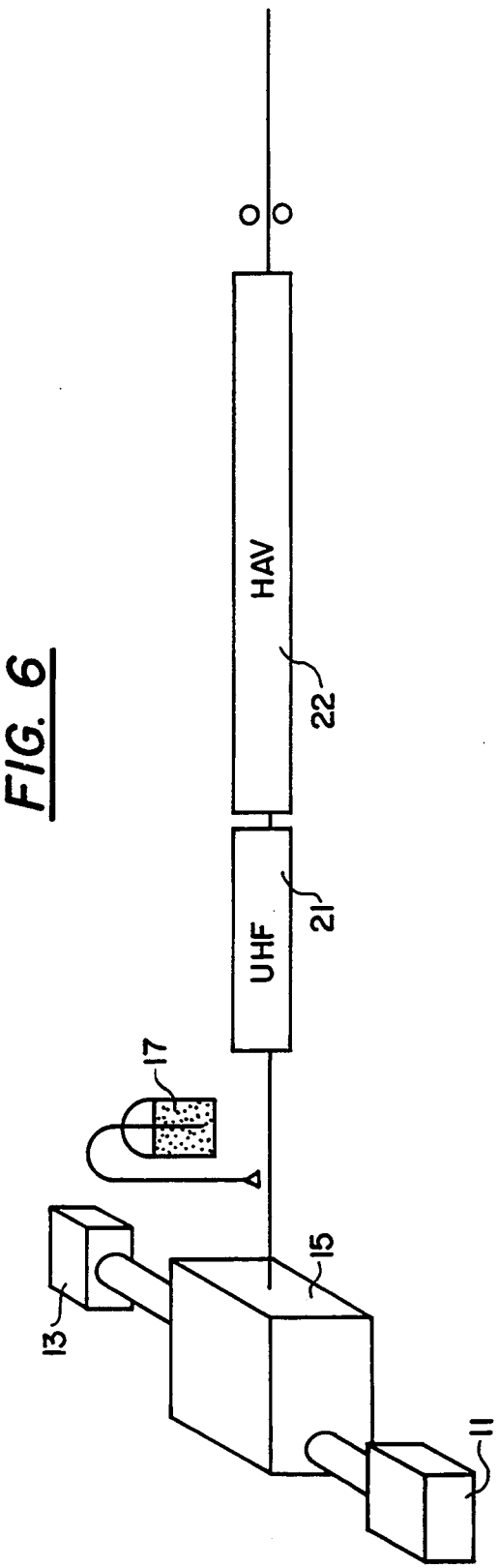
FIG. 6 shows a simplified block diagram for a process example to produce a glass run according to this invention.

In the first embodiment of the present invention, a method of producing a glass run made basically of EPDM substrate, with a urethane slip layer 3 (urethane coat) on the glass sliding area S and an adhesion (primer) layer 5 interposed between the substrate and the slip layer is provided (see FIGS. 1, 4, 6).

EPDM used herein shall be a sulfur-vulcanizable polymer obtained by having double bonds into side chains after copolymerization of ethylene, α-olefin and a small amount of non-conjugated diene as a third component such as ethylidene norbornene, cyclopentadiene, 1,4-hexadiene or the like. Normally, this polymer is blended with reinforcing fillers (such as carbon black or white carbon), plasticizers, slip agents, vulcanizers and/or other auxiliary materials. Table 1 shows an example of an EPDM recipe (solid rubber) for use in this invention.

The first feature of this embodiment comprises a process to co-extrude the glass run substrate 1, so that an adhesion layer (prime layer) 5 is formed at its glass sliding area S, comprising a blend of polymers or rubber blend compounded as specified below. In other words, this process allows a glass run substrate and an adhesion layer 5 to be co-extruded, using specified materials for each purpose. More specifically, the co-extrusion process is carried out by combining an extruder 11 for glass run substrate and an extruder 13 for adhesion layers with a multi-color extrusion head 15 (see FIG. 6).

The polymer blend for the adhesion (primer) layer preferably comprises NBR 40–80%, EPDM 20–60% and SBR 0–35% by weight, respectively. Generally, the amount of SBR present in the adhesive blend ranges from 5 to 30 percent by weight. The content of this blend polymer partly duplicates that disclosed in Japanese Patent Publication 62- 172043. Generally, the material is produced by emulsion polymerization.

If the NBR content goes below 40%, adhesion with the urethane slip layers (urethane coats) 3 becomes poor, whereas if the NBR content goes above 80%, adhesion with the EPDM glass run substrate becomes poor, and ozone resistance starts to become a problem.

If the EPDM content goes below 20%, ozone resistance of the adhesion layer 5 is liable to deteriorate, while if the EPDM content goes above 60%, close adhesion with urethane slip layers will become difficult to achieve.

If the SBR content goes above 35%, adhesion with the urethane slip layers becomes poor, and problems with ozone resistance are liable to occur.

Usually, the polymer blend is blended with reinforcing fillers (such as, carbon black or white fillers), plasticizers, slip agents, vulcanizers, coloring agents if needed and/or other auxiliary materials.

Plasticizers that can be used in addition to diethyl phthalate include di-butyl-phthalate (DBP), tricresyl phosphate (TCP), and the like.

Table 2 shows an example recipe. This will not be applicable if adhesion layer thickness is less than 0.5 mm and migration of some auxiliary materials, such as vulcanizer is expected.

The thickness of the adhesion layer 5 is preferably between 0.05 mm–2 mm. If the thickness is below 0.05 mm, the function intended will not be sufficient, and if it is more than 2 mm, the material cost will become high, and the rubber characteristics of glass run substrate 1 will, undesirably, be lost.

Then urethane coating material is applied by a coating material applicator 17 located just behind the extrusion head 15, on the glass sliding area S, that is on the adhesion layer 5 of the glass run substrate 1 immediately after its extrusion. Applicable coating methods include flow coating (shower coating), brush coating, roller coating, dip coating, and spray coating. If the coating area does not flow or can deform, flow coating is recommended.

The amount of urethane coating shall be determined by the slidability required but shall be in the range of a coat thickness of 20 to 100 μm.

The second feature of this invention is to use solventless urethane coating material to form the urethane slip layer 3. The solventless urethane coating material used herein shall be a liquid consisting essentially of a liquid polyol added with poly-isocyanate, liquid coat forming elements and auxiliary coat forming elements such as slip agents, and pigments only. It is entirely free from any evaporative diluent like a solvent.

The reason to use solventless type urethane coating is to eliminate pock-marks from forming on the coats during vulcanization of the glass run substrate. The solvent that has migrated into the rubber before vulcanization evaporates when vulcanized and causes foaming on the surface of the rubber material and leaves pock-marks.

Generally, two-pack coating material, for example, "Desmophene/Sumidule" shown in Table 3 is preferable because of its physical properties, however, one-pack coating can also be used.

Preferably, liquid or solid slip agents are added to the urethane coating material. Liquid slip agents such as dimethylsilicone oil (dynamic viscosity 3,000—3,000 cSt) are preferred, and solid slip agents such as fluorocarbon resin power (particles size 5–30 μm), molybdenum disulfide, boron nitride, tungsten disulfide and graphite fluoride are preferred. The compounding ratio of the slip agent is generally 5 to 100 parts per 100 parts urethane coating components. Use of less than 5 parts of slip agent will not create sufficient effect, and more than 100 parts will affect the hardness of the coats and weakens adhesion.

After application, the urethane coat is then cured simultaneously with the vulcanization process of the glass run substrate 1, so that the urethane slip layer 3 is obtained.

Illustrated vulcanizing systems radiation systems such as a microwave heater (UHF) 21 and high temperature heating such as a hot-air vulcanizer (HAV) 22 (see FIG. 6).

Normally, vulcanization will be performed for a period of time and at a temperature sufficient to effect cure, for example, 3-10 minutes at 200° C. This condition is appropriate to cure the urethane coats sufficiently.

The production method of this invention allows the urethane slip layer 3 to be formed on the glass run substrate by simply curing the applied urethane coat simultaneously with the vulcanization process, just after the glass run substrate 1 is extruded with the formed adhesion layer 5.

Figure 7:
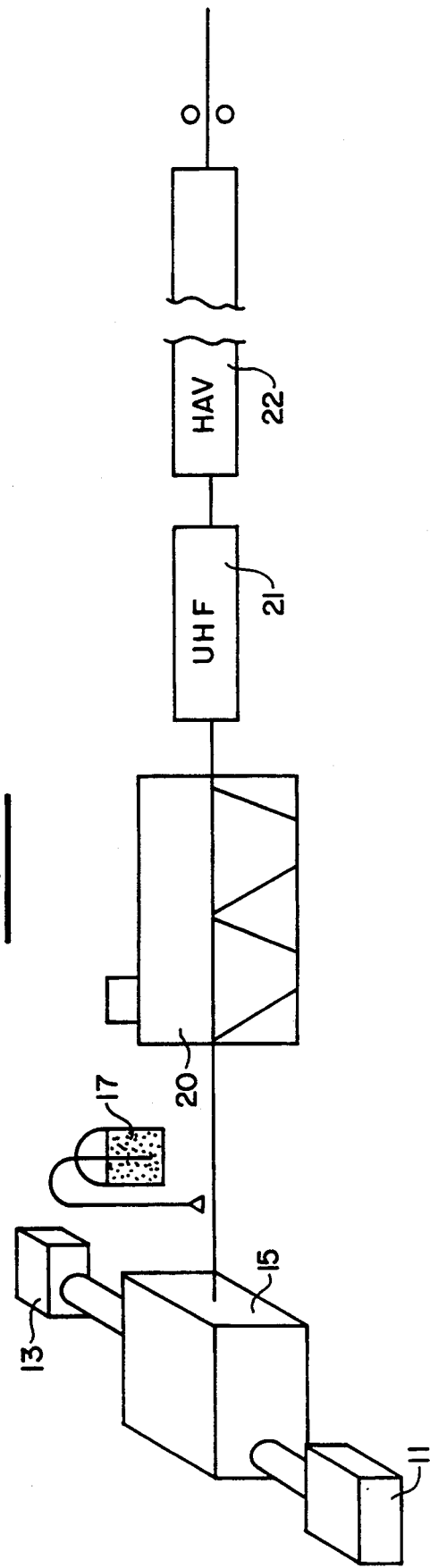
FIG. 7 shows a block diagram for another process example to produce a glass run according to this invention.

In a second embodiment of the present invention, a method of producing glass run substrate 1 made basically of EPDM, in which a flocked layer 5 is simultaneously formed on the glass sliding area S is provided. (See FIGS. 2, 5, 7).

This method differs from the first embodiment in that solventless urethane coating material is applied on the adhesion layer (the primer layer) 5 and then the formed coat 3a is treated for flocking 4, after which the urethane coat 3a is cured by vulcanization, and the flocked layer is formed. The flocking process requires the glass run substrate to pass through the electrostatic flocking unit 20, normally using nylon piles. The conditions for the urethane coats and vulcanization are essentially the same as those described above.

This method enables formation of the flocked layer 7 on the glass run substrate immediately after the glass run substrate 1 is coated with an extruded primer layer 5. This is achieved by first applying urethane coating material and forming the coat for flocking 3, then providing pines on the coats and finally curing the flocking coat 3 by vulcanizing.

In the third embodiment of the present invention, a method of producing glass runs substrate 1 made basically of EPDM is provided in which the flocked layer 7 on the grooved bottom 1a of the channel type glass run sliding area S is simultaneously formed and also the urethane slip layer 3 on both sides of sliding lip 1b is formed. (See FIGS. 3, 8).

This embodiment simultaneously produces the urethane slip layer 3 according to the first embodiment and the flocked layer 7 according to the second embodiment.

Figure 8:
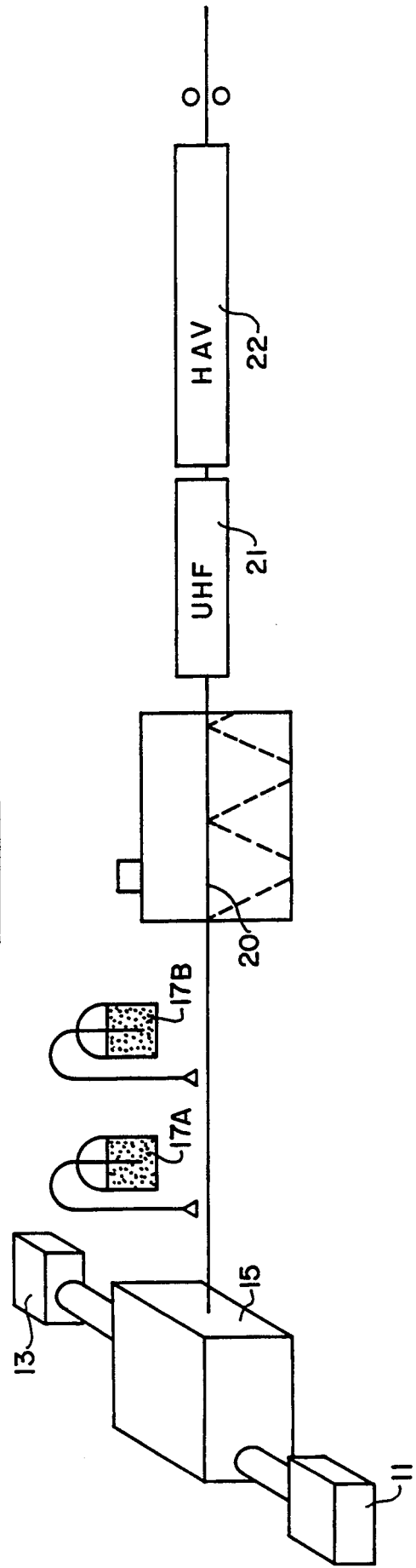
FIG. 8 shows a block diagram for a third process example to produce a glass run according to this invention.

In FIG. 8, item 17A refers to a prime-layer application and 17B refers to an urethane-coat application.

The production method of this embodiment allows the flocked layer 7 and the urethane slip layer 3 to be formed on the glass run substrate, just after the glass run substrate 1 is extruded with the formed primer layer 5. This is achieved simply by curing the urethane coat 3a or 3 simultaneously by vulcanizing the glass run substrate after applying urethane material to form the pile bed coat 3a of the flocked layer 7 and the urethane slip layer 3.

EXAMPLES

A specimen of a glass run (with the primer layer coat thickness 0.2 mm, but without the urethane coats 3 and 3A) was prepared in the following way, using a cross head extruder (cylinder 60 mm dia., compression ratio 1.5, extrusion rate 5 m/min.) and rubber materials according to the recipe shown in Table 1 and 2 specific for the glass run substrate 1 and primer layer 5. Then, the urethane coating material (viscosity 2700 cPs at 25° C.) with recipe according to Table 3 and 4 is applied, after deforming, by shower coating method on the primer layer of the grooved bottom 1a and sliding lip 1b so as to form a 100 μm thickness urethane coat 3, 3A thereon, and flocking process by electrostatic flocking device follows according to the following conditions on the urethane coat 3A of the grooved bottom 1a using nylon piles (thickness 3 d, length 0.8 mm).

| Electrostatic Flocking Conditions | |
|---|---|
| Amount of nylon piles to be spattered | 1 g/m |
| Distance between electrodes | 1000 mm |
| Flocking voltage | 30 kv |
| Flocking current | 0.1 mA |

The glass run processed for said flocking is brought into the hot air vulcanizing unit and left there for 10 minutes at 200° C. so as to vulcanize the glass run substrate 1 and the primer layer 5 and simultaneously cure the urethane coat 3 and 3A to form the flocked layer 7 and the urethane slip layer 3, thus completing the production processes of the glass run.

The glass run produced this way was left 24 hours at room temperature and then tested for the following:

Adhesive Strength (180° Peeling)

(1) The measurement of the adhesive strength between the adhesion layer 5 and the glass run substrate 1 (on the side of the bottom 1a) was taken with a pull speed of 10 cm/min.

(2) The measurement of the adhesive strength between the urethane slip layer 3 (sliding lip 1b side) and the primer layer 5 was taken at a pull speed of 10 cm/min, with reinforcing cloth (cotton) glued beforehand on the urethane slip layer 3. The measurement results indicated on Table 5 prove that the adhesive strength of the primer layer according to each of the embodiments is good against both of the glass run substrate (rubber substrate) and the urethane slip layer, and also that adhesion to the glass run substrate (rubber substrate) will improve if three-component type material blended with SBR is used.

Table 5 also shows the physical properties of the adhesion layer rubber measured according to JIS K-6301. It suggests ozone resistance deteriorates if SBR is excessive.

Dynamic Friction Coefficient Test

Two pieces of testing samples of the urethane slip layer 3 (sliding lip 1b side) in size of 5 mm wide and 50 mm ling were taken from the glass run according to the fifth embodiment. A steel plate was also prepared in size of 50 mm×50 mm ×1 mm thick. The above two samples were glued on the bottom face of this steel plate, one at right and the other at left edge, respectively, and then this plate was placed on a piece of glass. A weight of 1 kg. was put on the steel plate with samples glued on its bottom face, and the pull speed was 100 mm/min. The pull load average during slide movement was obtained by dividing with the total weight of the testing samples, the steel plate and the weight. In the case of fifth embodiment, the result was 0.25.

Test of Abrasion Against Glass

The equipment used for the test was KI type abrasion tester with 5 mm thick glass abrader piece, the conditions being 1 kg load, abrader cycle 60 rpm, abrader stroke 145 mm. The test was conducted for the urethane coat 3 and flocked layer 7. In the case of fifth embodiment, no exposure of rubber substrate was seen, after 10,000 cycles of abrasion actions, on any point of the sliding area, and flocking loss was negligible.

TABLE 1

Recipe for EPDM

|  | (parts by weight) |
|---|---|
| EPDM (JSR EP 57C)* | 100 |
| MAF carbon black | 130 |
| Process oil (paraffin-based) | 100 |
| Zinc oxide | 5 |
| Stearic acid | 1 |
| Dehydrant (CaO) | 5 |
| Vulcanization accelerator | 3.5 |
| Sulfur | 2 |

*Made by Japan Synthetic Rubber Co., Ltd.

TABLE 2

| Example No. | 1 | 2 | 3 |  | 4 | 5 | 6 | 7 |  |
|---|---|---|---|---|---|---|---|---|---|
| Comparative Example No. | 1 |  | 2 | 3 |  |  |  |  | 4 |
| NBR (JSR N230S) | 100 | 80 | 60 | 40 | 20 | 0 | 67 | 63 | 56 | 49 | 42 |
| EPDM (JSR EP35) | 0 | 20 | 40 | 60 | 80 | 100 | 28 | 27 | 24 | 21 | 18 |
| SBR (JSR 1502) | — | — | — | — | — | — | 5 | 10 | 20 | 30 | 40 |
| Stearic acid | 1 | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 | 5 |
| Plasticizer (DOP) | 25 | 25 | 25 | 25 | 25 | 25 | 25 | 25 | 25 | 25 | 25 |
| Magnesium silicate | 75 | 75 | 75 | 75 | 75 | 75 | 75 | 75 | 75 | 75 | 75 |
| Polyethylene glycol (PEG4000) | 2 | 2 | 2 | 2 | 2 | 2 | 2 | 2 | 2 | 2 | 2 |
| Dehydrant (CaO) | 5 | 5 | 5 | 5 | 5 | 5 | 5 | 5 | 5 | 5 | 5 |
| Vulcanization accelerator | 3.2 | 3.2 | 3.2 | 3.2 | 3.2 | 3.2 | 3.2 | 3.2 | 3.2 | 3.2 | 3.2 |
| Sulfur | 1.5 | 1.5 | 1.5 | 1.5 | 1.5 | 1.5 | 1.5 | 1.5 | 1.5 | 1.5 | 1.5 |

TABLE 3

| Component | Product Name | Parts by weight |
|---|---|---|
| Linear polyether polyol | Desmophen 1900U (Sumitomo-Bayer Urethane) | 30 |
| Branched polyalcohol containing ester and ether groups | Desmophen 1150 (Sumitomo-Bayer Urethane) | 70 |
| Pigment (carbon black) | — | 1 |
| Diphenylmethane diisocyanate | Sumidule 44V20 (Sumitomo-Bayer Urethane) | 1 |

TABLE 4

| Component | Product Name | Parts by weight |
|---|---|---|
| Linear polyether polyol | Desmophen 1900U (Sumitomo-Bayer Urethane) | 30 |
| Branched polyalcohol containing ester and ether groups | Desmophen 1150 (Sumitomo-Bayer Urethane) | 70 |
| Pigment (carbon black) | — | 1 |
| Dimethylsilicone oil | — | 20 |
| Tetrafluoroethylene resin powder (viscosity 100,000 cSt) | Lubro L-5 (Daikin) | 20 |
| Diphenylmethane diisocyanate | Sumidule 44V20 (Sumitomo-Bayer Urethane) | 1 |

TABLE 5

| Example No. | — | 1 | 2 | 3 | — | — |
|---|---|---|---|---|---|---|
| Comparative Example No. | 1 | — | — | — | 2 | 3 |
| Physical properties of primer layer | | | | | | |
| Tensile strength (kg/cm$^2$) | 88 | 85 | 83 | 83 | 81 | 80 |
| Elongation (%) | 570 | 600 | 610 | 610 | 630 | 640 |
| Hardness (JIS A) | 56 | 55 | 54 | 54 | 53 | 52 |
| Ozone resistance* | Cracked | Not cracked | Not cracked | Not cracked | Not cracked | Not cracked |
| Adhesion of primer layer to glass run proper | | | | | | |
| Peel strength (kg/10 mm) | 0.4 | 1.2 | 1.4 | 1.6 | 2.2 | 2.5 |
| Failure | Interfacial | Interfacial | Partly Interfacial | Partly Interfacial | Substrate | Substrate |
| Adhesion of urethane slip layer to primer layer | | | | | | |
| Peel strength (kg/10 mm) | 2.6 | 2.6 | 2.5 | 2.4 | 1.2 | 0.6 |
| Failure | Substrate | Substrate | Substrate | Substrate | Interfacial | Interfacial |

| Example No. | 4 | 5 | 6 | 7 | — |
|---|---|---|---|---|---|
| Comparative Example No. | — | — | — | — | 4 |
| Physical properties of primer layer | | | | | |
| Tensile strength (kg/cm$^2$) | 82 | 83 | 85 | 87 | 88 |
| Elongation (%) | 600 | 570 | 570 | 580 | 580 |
| Hardness (JIS A) | 55 | 55 | 55 | 56 | 56 |
| Ozone resistance* | Not | Not | Not | Not | Cracked |

TABLE 5-continued

|  | | | | | |
|---|---|---|---|---|---|
|  | cracked | cracked | cracked | cracked | |
| Adhesion of primer layer to glass run proper | | | | | |
| Peel strength (kg/10 mm) | 2.4 | 2.3 | 2.2 | 2.1 | 2.3 |
| Failure | Substrate | Substrate | Substrate | Substrate | Substrate |
| Adhesion of urethane slip layer to primer layer | | | | | |
| Peel strength (kg/10 mm) | 2.5 | 2.4 | 2.5 | 2.4 | 2.4 |
| Failure | Substrate | Substrate | Substrate | Substrate | Substrate |

*50 pphm, 20% elongation, 40° C., 70 hours

All publications mentioned hereinabove are hereby incorporated by reference.

While the foregoing invention has been described in some detail for purposes of clarity and understanding, it will be appreciated by one skilled in the art from a reading of this disclosure that various changes in form and detail can be made without departing from the true scope of the invention.

What is claimed is:

1. A method of producing a glass run substrate of ethylene-1-olefin-nonconjugated diene rubber along with a urethane slip layer on a glass sliding area of said glass run substrate which comprises:

co-extruding said glass run substrate with a primer layer on the glass sliding area of the glass run substrate, said primer layer comprising a polymer blend of nitrile rubber 40–80%, ethylene-1-olefin-nonconjugated diene rubber 20–60% and aromatic vinyl compound diene rubber 0–35% weight, respectively;

applying a solventless urethane coating material on said primer layer immediately after said co-extruding to form a urethane coat;

vulcanizing said glass run substrate and simultaneously curing said urethane coat thereby forming said urethane slip layer.

2. A method according to claim 1 wherein the primer layer ranges in thickness from about 0.05 mm to 2 mm.

* * * * *